United States Patent Office 3,288,759
Patented Nov. 29, 1966

3,288,759
POLYESTERS CONTAINING AN ORGANIC CARBOXYLIC ACID POLYANHYDRIDE, AND A TERTIARY AMINE AS CURE ACCELERATOR
Fred F. Holub, Scotia, and Matthew J. Smith, Schenectady, N.Y., assignors to General Electric Company, a corporation of New York
No Drawing. Filed Sept. 27, 1963, Ser. No. 311,953
16 Claims. (Cl. 260—75)

This invention is concerned with accelerating the cure of polyester resins. More particularly the invention is concerned with increasing the rate of cure, to the substantially insoluble and infusible state, of a polyester resin derived from a glycol, a polyhydric alcohol containing at least three hydroxyl groups, and an alkyl terephthalate, by employing conjointly a polyanhydride and a certain class of tertiary amines.

In U.S. Patent 2,936,296, issued May 10, 1960, and assigned to the same assignee as the present invention, there are disclosed and claimed polyester resins comprising the product of reaction of (1) a lower dialkyl ester of a member selected from the class consisting of terephthalic acid and isophthalic acid and mixtures of said members, (2) ethylene glycol, and (3) a saturated aliphatic polyhydric alcohol having at least three hydroxyl groups. These polyesters have been found to be especially useful as insulation for electrical conductors, particularly as insulation for magnet wires used in electrical apparatus. These polyester resins can be cured, i.e., converted to the substantially infusible and insoluble state, by heating them at elevated temperatures of the order of about 200 to as high as 450° C. In order to accelerate the cure whereby more rapid curing is obtained, and often at lower temperatures, various metal-containing curing catalysts have been employed for instance zinc octoate, cadmium octoate, etc., as well as certain diisocyanates including aromatic diisocyanates, aliphatic diisocyanates, etc. However, it has been found that when attempts were made to use these curing catalysts for the polyester resin, the cured products do not have sufficient resistance to solvents which is required in some applications, e.g., in motors used in refrigerators where the insulation is submerged in certain refrigerants.

Unexpectedly, we have discovered that these polyester resins can be cured rapidly at lower temperatures than have been used in the absence of any curing agent, while at the same time obtaining a cured product which shows improved resistance to solvents even at elevated temperatures. These advantages of acceleration of cure at lower temperatures and resulting improved resistance to solvents are obtained by employing a catalyst system for the polyester resin comprising a certain class of tertiary amines and an organic polyanhydride, e.g., an organic dianhydride.

The discovery that tertiary amines in combination with the polyanhydrides could accelerate the cure of the polyester resin to the extent found was entirely unexpected and in no way could have been predicted because the use of primary and secondary amines with the polyanhydrides gave much lower rates of cure acceleration and much lower resistance to solvents. Even the use of another type of tertiary amine such as 2,5-dimethyl piperazine again gave results which were inferior to the results obtained using the tertiary amines and quinoline recited previously.

The polyester resins with which the present invention is concerned comprises the product of reaction of (1) from 25 to 56 equivalent percent, preferably from 36 to 50 equivalent percent, of a lower dialkyl ester of a member selected from the class consisting of terephthalic acid and isophthalic acid and mixtures of said members, (2) from about 15 to 46 equivalent percent, and preferably from 25 to 40 equivalent percent, of ethylene glycol, and (3) from about 13 and 44 equivalent percent, and preferably from 20 to 32 equivalent percent, of a saturated aliphatic polyhydric alcohol having at least three hydroxyl groups. The preferred specific polyester resin of the present invention comprises the product of reaction of about 45 equivalent percent of dimethyl terephthalate, about 33 equivalent percent of ethylene glycol and about 22 equivalent percent of glycerin.

Among the lower dialkyl esters of terephthalic or isophthalic acids which may be used in the polyesters of the present invention are included, for example, those esters containing alkyl radicals having from 1 to 8 and preferably from 1 to 4 carbon atoms. These lower dialkyl esters include, for example, the dimethyl ester, the diethyl ester, the dipropyl ester, the dibutyl ester, etc.

The terms "polyhydric alcohol" and "saturated aliphatic polyhydric alcohol having at least three hydroxyl groups" as used in the present invention include both polyhydric alcohols in which the hydroxyl groups are connected by a plurality of carbon-carbon linkages as well as ether alcohols having at least three hydroxyl groups. Among the saturated aliphatic polyhydric alcohols having at least three hydroxyl groups within the scope of the present invention are included, for example, glycerin, 1,1,1-trimethylol ethane, 1,1,1-trimethylol propane, pentaerythritol, sorbitol, mannitol, diglycerol, dipentaerythritol, etc.

The term "functional group" as used in the present application is intended to refer to a carboxyl group (—COOH), as ester group (—COOR, where R is an alkyl), or a hydroxyl group (—OH). The term "equivalent" as used in the present application refers to the number of moles of a substance multiplied by the number of functional groups present in its structure. Thus, the number of equivalents of dimethyl terephthalate in a quantity of dimethyl terephthalate is the number of moles of dimethyl terephthalate present times two. The number of equivalents of glycerin present in a given quantity of glycerin is the number of moles of glycerin present in that quantity times three. The term "equivalent percent" as used in the present application refers to the number of equivalents of a particular reactant divided by the total number of equivalents of all reactants times one hundred. The compositions employed in the present invention are described in terms of equivalents instead of in terms of moles, since the ingerdients which make up the polyester resins react equivalent for equivalent rather than mole for mole.

More specific direction and additional information with regard to these polyester resins is disclosed in the aforesaid U.S. Patent 2,936,296, and by reference the disclosures of this patent are made part of the disclosure of the instant application.

The tertiary amines used in the curing system for the aforesaid polyester resins are selected from the class consisting of quinoline and tertiary amines having the general formula (1)     $R_3N$ where R is a monovalent hydrocarbon radical, for instance alkyl radicals, e.g., methyl, ethyl, propyl, butyl, octyl, etc., radicals; aryl radicals, e.g., phenyl, naphthyl, xylyl, tolyl, etc., radicals, aralkyl radicals, e.g., benzyl, phenylethyl, etc., radicals; alkenyl radicals, e.g., vinyl, allyl, etc., radicals; cyanoalkyl radicals, e.g., cyclohexyl, cycloheptyl, etc. radicals; cycloalkenyl radicals, e.g., cyclopentenyl, cyclohexenyl, etc., radicals. Among the tertiary amines which may be employed are, for instance, triethyl amine, tributyl amine, triamyl amine, methyl dibutyl amine, triphenyl amine, tribenzyl amine, methyldiphenyl amine, etc. For the purposes of this invention, the term "tertiary amine" as herein used is intended to mean amines of Formula I and quinoline.

The polyanhydrides, e.g., the tetracarboxylic acid dianhydrides useful in the practice of the present invention are characterized by the following formula:

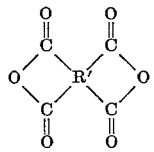

wherein R' is a tetravalent radical containing at least 2 carbon atoms, no more than 2 carbonyl groups of said dianhydride being attached to any one carbon atom of said tetravalent radical. Included among such radicals are, e.g., a radical derived from or containing an aromatic, aliphatic, cycloaliphatic, or combination of aromatic and aliphatic group, many examples of which have been given for R above. The preferred dianhydrides are those in which the R' groups have a least 6 carbon atoms characterized by benzenoid unsaturation, wherein each of the 4 carbonyl groups of the dianhydride are attached to a separate carbon atom in the tetravalent radical, the carbonyl groups being in pairs in which the groups in each pair are attached to adjacent carbon atoms of the R radical to provide a 5-membered ring as follows:

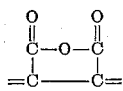

or

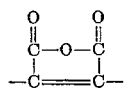

Illustrations of dianhydrides suitable for use in the present invention include:

pyromellitic dianhydride;
2,3,6,7-naphthalene tetracarboxylic dianhydride;
3,3',4,4'-diphenyl tetracarboxylic dianhydride;
1,2,5,6-naphthalene tetracarboxylic dianhydride;
2,2',3,3'-diphenyl tetracarboxylic dianhydride;
2,2-bis(3,4-dicarboxyphenyl)propane dianhydride;
bis(3,4-dicarboxyphenyl)sulfone dianhydride;
benzophenone tetracarboxylic dianhydride;
perylene 3,4,9,10-tetracarboxylic acid dianhydride;
bis(3,4-dicarboxyphenyl)ether dianhydride;
bis(3,4-dicarboxyphenyl)sulfone dianhydride;
ethylene tetracarboxylic acid dianhydride;
1,2,3,4-cyclopentanetetracarboxylic dianhydride;
ethylene-bis(trimellitate)dianhydride having the formula

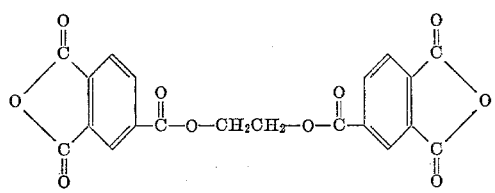

anhydrides of the formulas (a)
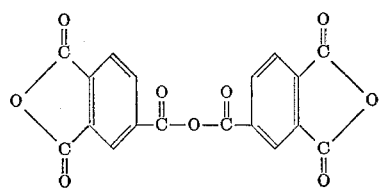

(b)*
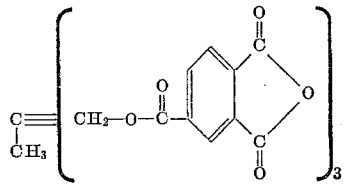

and (c)*
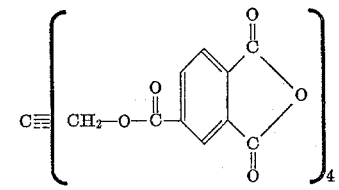

etc.

*These polyanhydrides can be made from trimellitic anhydride and either trimethylol ethane triacetate (b) or pentaerythritol tetraacetate (c).

The amount of the tertiary amine (or mixture of tertiary amines) which may be employed in the practice of the present invention can be varied widely. As the amount of tertiary amines increases, the acceleration of cure and attainment of greater resistance to solvents also is increased. Generally, we may employ on a weight basis from 0.01 to 10 parts, and preferably from 0.5 to 5 parts, of the tertiary amine per 100 parts of the polyester resin (on a dry, solids basis). Stated alternatively, it is preferred that the weight of the tertiary amine range from about 0.5 to 5 percent, by weight, based on the weight of the polyester resin.

The polyanhydride also can be employed in varying amounts. The amount of polyanhydride used can be more flexibly varied than the tertiary amine and advantageously comprises on a weight basis from about 0.1 to 25 percent, by weight, based on the weight of the polyester resin and preferably comprises from about 1 to 15 percent, by weight, based on the weight of the polyester resin. Mixtures of the polyanhydrides are not precluded.

The amount of amine and polyanhydride used will depend upon such factors as the type of amine and polyanhydride used, the kind of polyester, the application involved, etc.

The incorporation of the tertiary amine and the polyanhydride can be carried out by any means well known in the art. If it is desired to use the polyester resin in its dry state as a powder, it is only necessary to mix the polyester resin with the amine and the polyanhydride in suitable mixing equipment maintaining the mixing in such a way that discrete particles of the polyester resin are intimately coated with the mixture of the tertiary amine and the polyanhydride. When using such powders for insulating purposes, for instance, for coating stators or motors, this can advantageously be accomplished by fluidizing the polyester powder with the tertiary amine and polyanhydride added thereto, heating the object desired to be coated to a temperature of from about 150° to 250° C., dipping the heated object in the powder, removing the member from the powder with the adhering layer of the insulating powder, and thereafter heating the coated member at a temperature of from 150° to 350° C. for a time ranging from a few seconds to one to two minutes to effect flow of the discrete particles of powder and cohesion of the particles into a homogeneous coating which at the same time by the heat treatment is accelerated in cure and the resistance to solvents is materially improved. Powder spraying techniques may also be used, e.g., flame, electrostatic, etc.

The polyester resins of the present invention containing the tertiary amine and polyanhydride can also be employed in the form of solutions for insulating electrical conductors. Thus, the polyester resin with the tertiary amine and the polyhydride can be dissolved in suitable solvents, for instance, hydrocarbon solvents, methylnaphthalene, cresols, N-methyl-2-pyrrolidone, mixed biphenyl and diphenyl oxide, dimethylacetamide, etc., and while maintaining the solution in the liquid form, passing an electrical conductor, such as a copper or aluminum wire through the solution one or more times and heating the coated conductor at temperatures of about 250° to 450° C. for times ranging from a few seconds to one minute or more until the coating is converted to the substantially infusible and insoluble state. Woven or random glass cloth may be similarly treated. The concentration of the solutions of the polyester with the curing system therein can be varied widely and generally comprises on a weight basis from about 10 to 40 percent solids concentration of the polyester resin and the other curing system in the solvent used.

The method of applying solutions of the polyester resin to wire comprises passing the wire throguh the resin solution through a suitable die and then through an oven maintained at an elevated temperature to cure the resin on the wire. If desired, the wire may be passed through the resin solution and a die a number of times and through the oven after each pass through the resin solution. This will provide a greater enamel build than is obtainable with only one pass through the resin solution. The speed at which the wire is passed through the resin solution and the temperature at which the oven is maintained depend upon the particular resin solution employed, the build of enamel desired, the length of the oven in which the coated wire is cured, and the molecular weight of the resin used in the coating operation.

Where the polyester resins in the cured state are to be employed as slot insulations and in electrical machines, it is necessary to form cured sheets of films of the resins. This is accomplished by film-forming methods such as casting a solution of the resin and heating the casting to dry off the solvent and to cure the resin. Films can also be formed by extruding viscous solutions of the resin into a heating chamber where curing takes place. These films can be used as slot insulation in dynamoelectric machines by lining the slots in armatures with the film and placing the insulated winding into the lined slots. These films can also be used as a dielectric material in capacitors and are particularly valuable for use in aluminum foil type capacitors.

In order that those skilled in the art may better understand how the present invention may be practiced, the following examples are given by way of illustration and not by way of limitation. All parts are by weight, unless otherwise designated.

EXAMPLE 1

A polyester resin was prepared from the following ingredients:

| | Equivalent percent |
|---|---|
| Dimethyl terephthalate | 46 |
| Ethylene glycol | 31 |
| Glycerine (95%) | 23 |

These ingredients together with xylene were added to a three liter, three-necked flask fitted with a thermometer, stirrer, and a Vigreux column. Means were attached to the apparatus to remove water azeotropically as it formed the reaction. Throughout the reaction a nitrogen blanket was maintained over the reaction mixture. The mixture was heated for 30 minutes during which time the temperature rose to about 130° C. and the water and xylene azeotropically distilled from the system. At this time about 0.03 percent lead acetate (to accelerate the alcoholysis reaction) based on the weight of the dimethyl terephthalate, was added and the heating was continued for three and one-half hours more until a final temperature of about 240° C. was reached. The polyester resin thus obtained and so subsequently referred to was isolated as a dry powder by volatilizing any remaining xylene or water present therein.

The following examples illustrate the improvement in insolubility of using the mixture of the tertiary amine and the polyanhydrides as contrasted with omitting this curing system or employing the polyanhydride alone. The amine alone caused no acceleration in cure over polyester resins free of the amine.

To evaluate and compare the solubility of the various formulations, a chloroform solubility test was established as follows to determine the degree of cure of accelerated curing systems, using the polyanhydride and the tertiary amine as the curing system. The increase in insolubility of the resin formulation was measured as a function of time. Thus the polyester resin, polyanhydride (the actual crosslinking agent), and the accelerating tertiary amine were weighed and mixed together by grinding the mixture thoroughly to a fine powder. Approximately 0.7 gram of this powder was weighed as a thin layer into an aluminum cup and the cup was then placed on a thermostated hot plate at a temperature of 220° C. (±0.5° C.) for one minute. Thereafter, 0.4 gram of the cured resin was removed and weighed into another aluminum cup. A total of 15 cc. of chloroform was then added to the cup which was covered and the mixture of the cured resin and the chloroform allowed to remain for 22 hours at room temperature (27° C.). Thereafter, the chloroform was removed by filtration, the residue washed with additional chloroform, the remaining insoluble residue heated at 100° C. for one hour to remove any residual chloroform, and the weight of the insoluble residue was then determined and accordingly the percent insoluble resin calculated. The results obtained in this fashion were reproducible to a degree of ±0.3 percent.

EXAMPLE 2

In the present example, the amount of tertiary amine used was varied as shown in the following Table I while the amount of polyanhydride, in this instance pyromellitic dianhydride, was equal to 10 percent, by weight, of the weight of the polyeyster resin. More particularly, 10 parts of the pyromellitic dianhydride were used per 100 parts of the poyester resin of Example 1. The dimethyl cocoamine used in the following examples is a tertiary amine manufactured by Armour Industrial Chemical Company, a Division of Armour Company, Chicago, Illinois, under the name of Armeen-DMCD and has the formula $(CH_3)_2NR''$ where $R''$ is a mixture of saturated aliphatic hydrocarbon radicals of chain length $C_8$–$C_{18}$, so composed that the entire tertiary amine has a mean molecular weight equal to 228. Table I below shows the amount of tertiary amine used (so calculated that the nitrogen content was constant for all the samples, i.e., about 0.09 part nitrogen per 100 parts resin), and the percent insoluble material (as a result of carrying out the above-described chloroform solubility test) after one minute at 220° C.

Table I

| Sample No. | Tertiary Amine | Concentration of Tertiary Amine Parts | Percent Insoluble Resin |
|---|---|---|---|
| 1 | None | | 9 |
| 2 | Tribenzylamine | 1.9 | 29 |
| 3 | Dimethyloctadecylamine | 2.0 | 30 |
| 4 | Triamylamine | 1.5 | 30 |
| 5 | Dimethyldodecylamine | 1.4 | 36 |
| 6 | Dimethylcocoamine | 1.5 | 37 |
| 7[1] | Benzyldimethylamine | 0.9 | 33 |
| 8 | Quinoline | 1.0 | 35 |

[1] Dispersed in 5.1 parts of a molecular sieve.

EXAMPLE 3

In this example, formulations were prepared similarly as in Example 2 with the exception that primary and secondary amines as well as other types of tertiary amines not encompassed within the scope of the present invention were used as accelerators for the pyromellitic dianhydride. In each instance the mixing of the ingredients (including the polyester resin of Example 1), the proportions, the curing and testing of the resulting products were the same as in Example 2. The results of these tests are shown in Table II below.

Table II

| Sample No. | Amine | Concentration [1] of Amine Parts | Percent Insoluble Resin |
|---|---|---|---|
| 9 | Dibenzylamine | 1.3 | 20 |
| 10 | Monobenzylamine | 0.7 | 15 |
| 11 | 2,5-Dimethylpiperazine | 2.2 | 18 |

[1] Per 100 parts polyester resin of Example 1 and 10 parts pyromellitic dianhydride.

EXAMPLE 4

This example illustrates the improvements in kind to be obtained from using a tertiary amine with various anhydrides. The example also shows the effect of using a monoanhydride, specifically phthalic anhydride as contrasted to the polyanhydrides claimed in the present invention. In order to better illustrate the improvements derived by using the tertiary amine, in this instance dimethyl cocoamine, with the various anhydrides, it was found desirable to establish the percent insoluble material obtained both with and without the dimethyl cocoamine. Accordingly, the curing was also carried out on samples for one minute at 220° C. containing only the anhydride as well as samples containing both the anhydride and the amine. The percent insoluble resin determined in the absence of the tertiary amine was identified as the percent zero cure. It will be noted that when the dimethyl cocoamine was added, the differential in insolubility between that obtained without the tertiary amine and that obtained in the presence of the tertiary amine was highly significant as will be shown from the following Table III. All mixing, testing, and evaluating was done similarly as was done in Example 2.

dipped into the above-mentioned powder formulation in a fluid bed apparatus and thereafter withdrawn. After a 5 minute bake at 220° C. the cores were allowed to cool to room temperature at which time it was noted that the powder particles had coalesced to a thin, homogeneous, cured tightly adherent film. The impact strength of the film obtained by the above procedure was tested and evaluated by the Gardner variable impact test for coatings on metal substrates. This test measures the impact strength of thin films (10–15 mils) on metal substrates. The test is performed by impacting the surface of the coating with a weight which is dropped from a known height. Thus, the inch pounds of force necessary to produce a film failure can be obtained. A film failure is defined as the point at which the film is no longer electrically sound when tested with a spark coil. As a result of the above impact test, it was found that the impact strength of the stator core was 150 inch pounds, clearly establishing a highly crosslinked system for the polyester resin. When the same procedure was carried out for coating the stator core in the polyester powder employing only the pyromellitic dianhydride without the amine, and the coated stator core heated for 5 minutes at 220° C., the impact strength was found to be only 25 inch pounds. Substituting 1.35 parts dimethylcocoamine for the tribenzylamine gave an impact strength of 115 inch pounds.

It will of course be apparent to those skilled in the art that in addition to the tertiary amines and the polyanhydrides employed in the foregoing examples, other tertiary amines of the selected class and other polyanhydrides may be employed without departing from the scope of the invention. The polyester resins used may also be varied within the range of ingredients used to make such polyester resins. The proportion of ingredients can be varied within wide limits and no intent is to be read into the examples or disclosures that there are any restrictions as to proportions of ingredients.

Although the utility of the polyester resins of our invention has been described principally in terms of electrical applications, it should be understood that these Table III

| Sample No. | Anhydride | Parts [1] Anhydride | Parts Dimethyl-Cocoamine | Percent Zero Cure | Percent Insoluble Resin |
|---|---|---|---|---|---|
| 12 | Phthalic Anhydride | 13.6 | | 7.0 | 6.5 |
| 13 | do | 13.6 | 1.5 | 7.0 | 6.7 |
| 14 | Para-phenylene-bis(trimellitate)dianhydride: 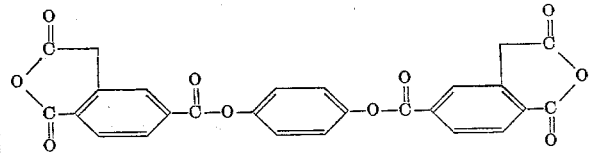 | 21.0 | | 12.0 | 15.2 |
| 15 | Same as in Sample No. 14 | 21.0 | 1.5 | 12.0 | 24.7 |
| 16 | Pyromellitic dianhydride | 10.0 | | 6.2 | 9.0 |
| 17 | do | 10.0 | 1.5 | 6.2 | 37.0 |

[1] Per 100 parts polyester resin of Example 1.

EXAMPLE 5

This example illustrates the ability to take advantage of the rapid curing of polyester resins by means of the amine acceleration to coat various objects with powders comprising the polyester resins and our above-described curing system, and thereafter heating the coated object at elevated temperatures for short periods of time to effect coalescence of the powder particles and curing of the resin. More particularly, a dry mixture was prepared of 100 parts of the polyester resin of Example 1, 50 parts finely divided fume silica, 10 parts pyromellitic dianhydride, and 0.9 part tribenzyl amine. Annealed stator cores (which are used in fractional horsepower motors) were coated in the following manner to a thickness of 10 to 12 mils. The cores were heated to 220° C. and resins may be used in all of the other applications suitable for synthetic resins. Thus, these resins can be employed in protective coating applications by applying the resin in a suitable solvent to a surface by brushing or spraying with subsequent curing. When used as a protective coating, these resins have outstanding resistance to weathering and do not discolor after extended exposure to elevated temperatures. These resins can also be employed in varnish and paint formulations. These resins can also be used in molding powder formulations by mixing them with various fillers such as wood flour, diatomaceous earth, carbon, silica, etc. These resins are also useful as impregnants and as bonding materials for metallic and fibrous laminates.

The polyester resins of the present invention may be mixed and cured with minor amounts of other resins such as melamine-formaldehyde resins, epoxide resins such as the reaction product of epichlorohydrin and bisphenol-A, phenol-formaldehyde resins, aniline-formaldehyde resins, urea-formaldehyde resins, silicone resins, cellulose acetate resins, polyamide resins, vinyl resins, ethylene resins, styrene resins, butadiene styrene resins, etc.

In the foregoing discussion and examples, we have described the preparation of the polyester resins of the present invention from a mixture of ingredients including a lower dialkyl ester of terephthalic or isophthalic acid. However, it should be understood that instead of the lower dialkyl ester, we may use the acid itself, the chloride of the acid, or the half ester of the acid; but we prefer to use the lower dialkyl ester in making the polyester resin because of the greater solubility and reactivity of the diester than of the acid itself or its other derivatives.

The use of derivatives of the aforesaid amines, for instance, salts, such as tributyl amine hydrochloride, triamyl amine acetate, etc.; quaternary ammonium bases of the amines, such as, benzyl trimethyl ammonium hydroxide, benzyl trimethyl ammonium methoxide, etc., which decompose to amines (which are the effective cure accelerating agents), in place of the amines themselves, is not precluded.

What we claim as new and desire to secure by Letters Patent of the United States is:

1. A composition of the matter comprising (1) a polyester resin obtained from the product of reaction of a dialkyl ester of a member selected from the class consisting of terephthalic acid and isophthalic acid, and mixtures of said members, ethylene glycol, and a saturated aliphatic polyhydric alcohol having at least three hydroxyl groups, (2) an organic carboxylic acid polyanhydride, and (3) a tertiary amine selected from the class consisting of quinoline and amines having the formula $R_3N$ where R is a monovalent hydrocarbon radical.

2. A composition of the matter comprising (1) a polyester resin obtained by heating a mixture of (a) from 25 to 56 equivalent percent of a lower dialkyl ester member selected from the class consisting of terephthalic acid and isophthalic acid and mixtures of said members, (b) from 15 to 46 equivalent percent ethylene glycol, and (c) from about 13 to 44 equivalent percent of a saturated aliphatic polyhydric alcohol having at least three hydroxyl groups, the sum of equivalent percents of (a), (b) and (c) being equal to 100 equivalent percent, (2) pyromellitic dianhydride, and (3) tribenzyl amine.

3. A composition of the matter comprising (1) a polyester resin obtained by heating a mixture of (a) from 25 to 56 equivalent percent of a lower dialkyl ester member selected from the class consisting of terephthalic acid and isophthalic acid and mixtures of said members, (b) from 15 to 46 equivalent percent ethylene glycol, and (c) from about 13 to 44 equivalent percent of a saturated aliphatic polyhydric alcohol having at least three hydroxyl groups, the sum of equivalent percents of (a), (b) and (c) being equal to 100 equivalent percent, (2) pyromellitic dianhydride, and (3) dimethyl dodecyl amine.

4. A composition of the matter comprising (1) a polyester resin obtained by heating a mixture of (a) from 25 to 56 equivalent percent of a lower dialkyl ester member selected from the class consisting of terephthalic acid and isophthalic acid and mixtures of said members, (b) from 15 to 46 equivalent percent ethylene glycol, and (c) from about 13 to 44 equivalent percent of a saturated aliphatic polyhydric alcohol having at least three hydroxyl groups, the sum of equivalent percents of (a), (b) and (c) being equal to 100 equivalent percent, (2) pyromellitic dianhydride, and (3) dimethyl cocoamine.

5. A composition of the matter comprising (1) a polyester resin obtained by heating a mixture of (a) from 25 to 56 equivalent percent of a lower dialkyl ester member selected from the class consisting of terephthalic acid and isophthalic acid and mixtures of said members, (b) from 15 to 46 equivalent percent ethylene glycol, and (c) from about 13 to 44 equivalent percent of a saturated aliphatic polyhydric alcohol having at least three hydroxyl groups, the sum of equivalent percents of (a), (b) and (c) being equal to 100 equivalent percent, (2) pyromellitic dianhydride, and (3) benzyl dimethyl amine.

6. A composition of the matter comprising (1) a polyester resin obtained by heating a mixture of (a) from 25 to 56 equivalent percent of a lower dialkyl ester member selected from the class consisting of terephthalic acid and isophthalic acid and mixtures of said members, (b) from 15 to 46 equivalent percent ethylene glycol, and (c) from about 13 to 44 equivalent percent of a saturated aliphatic polyhydric alcohol having at least three hydroxyl groups, the sum of equivalent percents of (a), (b) and (c) being equal to 100 equivalent percent, (2) pyromellitic dianhydride, and (3) quinoline.

7. A composition of the matter comprising (1) a polyester resin obtained by heating a mixture of (a) from 25 to 56 equivalent percent of a lower dialkyl ester member selected from the class consisting of terephthalic acid and isophthalic acid and mixtures of said members, (b) from 15 to 46 equivalent percent ethylene glycol, and (c) from about 13 to 44 equivalent percent of a saturated aliphatic polyhydric alcohol having at least three hydroxyl groups, the sum of equivalent percents of (a), (b) and (c) being equal to 100 equivalent percent, (2) pyromellitic dianhydride, and (3) triamyl amine.

8. A composition of the matter comprising (1) a polyester resin obtained by heating a mixture of (a) from 25 to 56 equivalent percent of a lower dialkyl ester member selected from the class consisting of terephthalic acid and isophthalic acid and mixtures of said members, (b) from 15 to 46 equivalent percent ethylene glycol, and (c) from about 13 to 44 equivalent percent of a saturated aliphatic polyhydric alcohol having at least three hydroxyl groups, the sum of equivalent percents of (a), (b) and (c) being equal to 100 equivalent percent (2) p-phenylene-bis(trimellitate)dianhydride, and (3) dimethyl cocoamine.

9. The heat-treated product of claim 1.
10. The heat-treated product of claim 2.
11. The heat-treated product of claim 3.
12. The heat-treated product of claim 4.
13. The heat-treated product of claim 5.
14. The heat-treated product of claim 6.
15. The heat-treated product of claim 7.
16. The heat-treated product of claim 8.

References Cited by the Examiner

UNITED STATES PATENTS

| | | | |
|---|---|---|---|
| 3,053,783 | 9/1962 | Broadhead et al. | 260—75 |
| 3,136,733 | 6/1964 | Ross et al. | 260—75 |
| 3,182,073 | 5/1965 | Loncrini | 260—75 |

WILLIAM H. SHORT, *Primary Examiner.*

R. T. LYON, *Assistant Examiner.*